United States Patent
Liu et al.

(10) Patent No.: US 11,763,432 B2
(45) Date of Patent: Sep. 19, 2023

(54) MULTI-EXPOSURE IMAGE FUSION METHOD BASED ON FEATURE DISTRIBUTION WEIGHT OF MULTI-EXPOSURE IMAGE

(71) Applicant: XI'AN UNIVERSITY OF POSTS & TELECOMMUNICATIONS, Xi'an (CN)

(72) Inventors: Weihua Liu, Xi'an (CN); Biyan Ma, Xi'an (CN); Ying Liu, Xi'an (CN); Yanchao Gong, Xi'an (CN); Fuping Wang, Xi'an (CN)

(73) Assignee: XI'AN UNIVERSITY OF POSTS & TELECOMMUNICATIONS, Xi'an (CN)

( * ) Notice: Subject to any disclaimer, the term of this patent is extended or adjusted under 35 U.S.C. 154(b) by 93 days.

(21) Appl. No.: 17/679,400

(22) Filed: Feb. 24, 2022

(65) Prior Publication Data

US 2022/0351344 A1    Nov. 3, 2022

(30) Foreign Application Priority Data

Apr. 27, 2021   (CN) .......................... 202110459450.7

(51) Int. Cl.
   *G06T 5/00*   (2006.01)
   *G06T 5/50*   (2006.01)

(52) U.S. Cl.
   CPC ................ *G06T 5/009* (2013.01); *G06T 5/50* (2013.01); *G06T 2207/10024* (2013.01); *G06T 2207/20221* (2013.01)

(58) Field of Classification Search
   CPC . G06T 5/009; G06T 5/50; G06T 2207/10024; G06T 2207/20221; G06T 2207/10016; G06T 2207/10144; G06T 2207/20016; G06T 2207/20208; G06T 7/90
   See application file for complete search history.

(56) References Cited

U.S. PATENT DOCUMENTS

| | | | | |
|---|---|---|---|---|
| 9,654,700 | B2* | 5/2017 | Kovtun | .................... G06T 5/002 |
| 11,458,542 | B2* | 10/2022 | Scime | ..................... B22F 12/90 |
| 2018/0027224 | A1* | 1/2018 | Javidnia | .................. G06T 7/593 |
| | | | | 382/154 |

(Continued)

*Primary Examiner* — Mia M Thomas
(74) *Attorney, Agent, or Firm* — BACON & THOMAS, PLLC

(57) ABSTRACT

The present disclosure provides a multi-exposure image fusion (MEF) method based on a feature distribution weight of a multi-exposure image, including: performing color space transformation (CST) on an image, determining a luminance distribution weight of the image, determining an exposure distribution weight of the image, determining a local gradient weight of the image, determining a final weight, and determining a fused image. The present disclosure combines the luminance distribution weight of the image, the exposure distribution weight of the image and the local gradient weight of the image to obtain the final weight, and fuses the input image and the weight with the existing pyramid-based multi-resolution fusion method to obtain the fused image, thereby solving the technical problem that an existing MEF method does not consider the overall feature distribution of the multi-exposure image.

3 Claims, 2 Drawing Sheets

(56) References Cited

U.S. PATENT DOCUMENTS

| | | | | |
|---|---|---|---|---|
| 2019/0004124 A1* | 1/2019 | Huang | .................... | F17D 5/06 |
| 2019/0392565 A1* | 12/2019 | Lakemond | ................ | G06T 5/20 |
| 2020/0003729 A1* | 1/2020 | Huang | ................ | G01N 17/006 |
| 2021/0314474 A1* | 10/2021 | Yang | .................... | H04N 23/73 |
| 2021/0375044 A1* | 12/2021 | George | ................ | G06T 15/04 |
| 2022/0134435 A1* | 5/2022 | Scime | .................... | G06T 7/11 |
| | | | | 264/112 |
| 2022/0366588 A1* | 11/2022 | Cho | .................... | G06V 10/82 |
| 2022/0375043 A1* | 11/2022 | Verma | .................... | G06T 5/005 |

* cited by examiner

MULTI-EXPOSURE IMAGE FUSION METHOD BASED ON FEATURE DISTRIBUTION WEIGHT OF MULTI-EXPOSURE IMAGE

CROSS REFERENCE TO RELATED APPLICATION

This patent application claims the benefit and priority of Chinese Patent Application No. 202110459450.7, filed on Apr. 27, 2021, the disclosure of which is incorporated by reference herein in its entirety as part of the present application.

TECHNICAL FIELD

The present disclosure belongs to the technical field of image processing, and particularly relates to reconstruction of high dynamic range (HDR) images.

BACKGROUND ART

There is a very wide dynamic range in nature from $10^{-3}$ cd/m$^2$ in the nighttime to $10^6$ cd/m$^2$ in the daytime. Human eyes adaptive to light can observe natural scenes within 1:10$^4$ dynamic range. The dynamic range captured by common digital cameras is merely 0-255. As information in common low dynamic range (LDR) images cannot express HDR scenes completely, a number of methods have been proposed by the researchers. Conventionally, the dynamic ranges and contents of the LDR images are extended with an expansion operator, and the HDR images are then reconstructed according to a response function of the camera; and due to complicated and difficulty computation for the response function of the camera, it is common practice to input multiple LDR images with different exposures to determine their respective weight maps and obtain the high-quality LDR images through weighted fusion. The HDR images cannot be directly displayed on common display devices, unless they are transformed into the LDR images by tone mapping. The LDR images obtained by fusing multiple exposure images can be viewed as the LDR images after the tone mapping, and this is called the multi-exposure image fusion (MEF) method.

The MEF method includes the patch-wise and pixel-wise approaches. The former is to divide an input image into different patches and determine the weight map of the image according to features of each patch; and for the fused image obtained, it is necessary to eliminate spatial artifacts between the patches and to pre-process or post-process the image. The latter is to obtain the weight map by computing the weight value at each pixel of the input image. Thus, it is of great importance to determine the weight function of the weight map. The existing pixel-wise MEF method generally only designs the weight function according to the feature distribution of the input image, and mostly needs to set parameters and cannot determine the weight adaptively.

SUMMARY

In view of the defects in the prior art, the present disclosure provides an MEF method based on a feature distribution weight of a multi-exposure image, with high fusion quality, simple computation, and inclusion of abundant information and clear details in the fused image.

To solve the above technical problems, the technical solution used by the present disclosure includes the following steps:

(1) performing color space transformation (CST) on an image transforming red, green, and blue (RGB) color components of an input multi-exposure image into a luminance component $Y_n(x,y)$, a blue chrominance component $Cb_n(x,y)$, and a red chrominance component $Cr_n(x,y)$:

$$Y_n(x,y)=0.257R_n(x,y)+0.564G_n(x,y)+0.098B_n(x,y)+16$$

$$Cb_n(x,y)=-0.148R_n(x,y)-0.291G_n(x,y)+0.439B_n(x,y)+128$$

$$Cr_n(x,y)=0.439R_n(x,y)-0.368G_n(x,y)-0.071B_n(x,y)+128 \quad (1)$$

where, $R_n(x,y)$ is a red component at a pixel (x,y) in an nth image, $G_n(x,y)$ is a green component at the pixel (x,y) in the nth image, $B_n(x,y)$ is a blue component at the pixel (x,y) in the nth image, n is a finite positive integer, $n \in [1,N]$, (x,y) is a position coordinate of the pixel, and N is a number of exposure images and is a finite positive integer;

(2) determining a luminance distribution weight of the image determining the luminance distribution weight $w_{1,n}(x,y)$ of the image according to eq. (2):

$$w_{1,n}(x, y) = \exp\left(-\frac{(Y_n(x, y) - (1 - m_n))^2}{2S_n^2(x, y)}\right) \quad (2)$$

$$S_n(x, y) = \frac{Y_n(x, y)}{\sum_{n=1}^{N} Y_n(x, y)}$$

where, $m_n$ is a mean of the nth image;

(3) determining an exposure distribution weight of the image determining the exposure distribution weight $w_{2,n}(x,y)$ of the image according to eq. (3):

$$w_{2,n}(x, y) = 1 - D_n(x, y) \quad (3)$$

$$D_n(x, y) = |Y_n(x, y) - m(x, y)|$$

$$m(x, y) = \frac{1}{N}\sum_{n=1}^{N} Y_n(x, y)$$

(4) determining a local gradient weight of the image determining the local gradient weight $w_{3,n}(x,y)$ of the image according to eq. (4):

$$w_{3,n}(x, y) = \frac{grad_n(x, y)}{\sum_{n=1}^{N} grad_n(x, y) + \varepsilon} \quad (4)$$

$$grad_n(x, y) = \sqrt{d_x^2(x, y) + d_y^2(x, y)}$$

$$d_x(x, y) = \frac{\partial(Y_n(x, y) \otimes G_1(x, y))}{\partial x}$$

$$d_y(x, y) = \frac{\partial(Y_n(x, y) \otimes G_1(x, y))}{\partial y}$$

$$G_1(x, y) = \frac{1}{2\pi\sigma_1^2}\exp\left(-\frac{(x - (k_1 + 1))^2 + (y - (k_1 + 1))^2}{2\sigma_1^2}\right)$$

where, ε is in a range of $[10^{-14}, 10^{-10}]$, ⊗ is a filtering operation, $G_1(x,y)$ is a two-dimensional (2D) Gaussian kernel function, $k_1$ is a parameter on a window size of a filter, $k_1 \in [2,16]$, and $\sigma_1$ is a standard deviation of the filter, $\sigma_1 \in (0,5]$;

(5) determining a final weight determining the final weight $W_n(x,y)$ according to eq. (5):

$$W_n(x, y) = \frac{g_n(x, y)}{\sum_{n=1}^{N} g_n(x, y) + \varepsilon} \quad (5)$$

$$g_n(x, y) = w_n(x, y) \otimes G_2(x, y)$$

$$G_2(x, y) = \frac{1}{2\pi\sigma_2^2} \exp\left(-\frac{(x - (k_2 + 1))^2 + (y - (k_2 + 1))^2}{2\sigma_2^2}\right)$$

$$w_n(x, y) = w_{1,n}(x, y) \times w_{2,n}(x, y) \times w_{3,n}(x, y)$$

where, $G_2(x,y)$ is a 2D Gaussian kernel function, $k_2$ is a parameter on a window size of a filter, $k_2 \in [2,20]$, and $\sigma_2$ is a standard deviation of the filter, $\sigma_2 \in (0,10]$; and (6) determining a fused image fusing the input image and the weight with an existing pyramid-based multi-resolution fusion method to determine the fused image; and completing the MEF method based on a feature distribution weight of a multi-exposure image.

In step (4) of the present disclosure, the $k_1$ is 8, and the $\sigma_1$ is 2.

In step (5) of the present disclosure, the $k_2$ is 10, and the $\sigma_2$ is 5.

By determining the luminance distribution weight of the image, the exposure distribution weight of the image and the local gradient weight of the image, the present disclosure combines the luminance distribution weight of the image, the exposure distribution weight of the image and the local gradient weight of the image to obtain the final weight; and the present disclosure fuses the input image and the weight with the existing pyramid-based multi-resolution fusion method to obtain the fused image. When the weight of the input image is determined, considerations are given to the feature distribution of the multi-exposure image. The weight function can adaptively compute the weight for each pixel in the images, and can obtain the weights of the images simply and quickly, to solve the technical problem that the existing MEF method does not consider the overall feature distribution of the multi-exposure image. The present disclosure has the advantages of high fusion quality, simple computation, and inclusion of abundant information and clear details in the fused image, and so on, and can be applied to the MEF to reconstruct HDR images.

DETAILED DESCRIPTION OF THE EMBODIMENTS

The present disclosure will be further described below in detail with reference to accompanying drawings and embodiments, but the present disclosure is not limited to the following embodiments.

Embodiment 1

Figure 1:
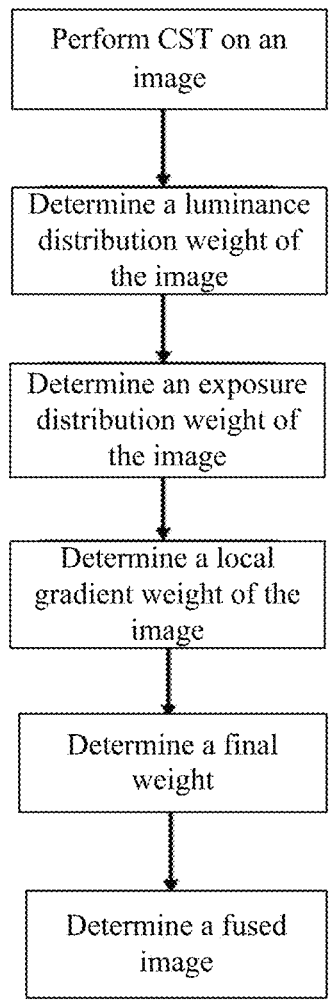
FIG. 1 is a flow chart according to Embodiment 1 of the present disclosure.

Taking four input images of the multi-exposure cave image as an example, the MEF method based on a feature distribution weight of a multi-exposure image in the embodiment includes the following steps (refer to FIG. 1):

(1) CST is performed on an image

Figure 2:
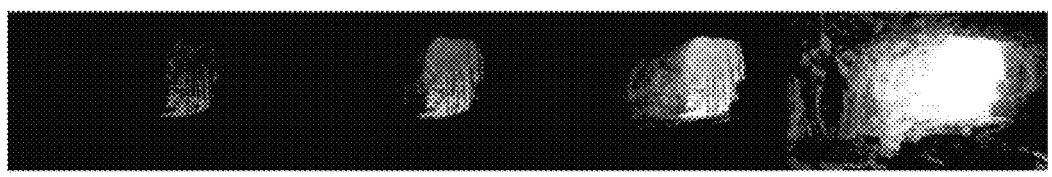
FIG. 2 illustrates four input images of a multi-exposure cave image of Embodiment 1.

RGB color components of an input multi-exposure image are transformed into a luminance component $Y_n(x,y)$, a blue chrominance component $Cb_n(x,y)$, and a red chrominance component $Cr_n(x,y)$:

$$Y_n(x,y) = 0.257 R_n(x,y) + 0.564 G_n(x,y) + 0.098 B_n(x,y) + 16$$

$$Cb_n(x,y) = -0.148 R_n(x,y) - 0.291 G_n(x,y) + 0.439 B_n(x,y) + 128$$

$$Cr_n(x,y) = 0.439 R_n(x,y) - 0.368 G_n(x,y) - 0.071 B_n(x,y) + 128 \quad (1)$$

where, $R_n(x,y)$ is a red component at a pixel (x,y) in an nth image, $G_n(x,y)$ is a green component at the pixel (x,y) in the nth image, $B_n(x,y)$ is a blue component at the pixel (x,y) in the nth image, n is a finite positive integer, $n \in [1,N]$, (x,y) is a position coordinate of the pixel, and N is a number of exposure images. In the embodiment, the input images are as shown in FIG. 2, and the N is 4. For different input images, the N and the number of input images are the same.

(2) A luminance distribution weight of the image is determined

The luminance distribution weight $w_{1,n}(x,y)$ of the image is determined according to Eq. (2):

$$w_{1,n}(x, y) = \exp\left(-\frac{(Y_n(x, y) - (1 - m_n))^2}{2 S_n^2(x, y)}\right) \quad (2)$$

$$S_n(x, y) = \frac{Y_n(x, y)}{\sum_{n=1}^{N} Y_n(x, y)}$$

where, $m_n$ is a mean of the nth image.

(3) An exposure distribution weight of the image is determined

The exposure distribution weight $w_{2,n}(x,y)$ of the image is determined according to Eq. (3):

$$w_{2,n}(x, y) = 1 - D_n(x, y) \quad (3)$$

$$D_n(x, y) = |Y_n(x, y) - m(x, y)|$$

$$m(x, y) = \frac{1}{N} \sum_{n=1}^{N} Y_n(x, y)$$

(4) A local gradient weight of the image is determined

The local gradient weight $w_{3,n}(x,y)$ of the image is determined according to Eq. (4):

$$w_{3,n}(x, y) = \frac{grad_n(x, y)}{\sum_{n=1}^{N} grad_n(x, y) + \varepsilon} \quad (4)$$

$$grad_n(x, y) = \sqrt{d_x^2(x, y) + d_y^2(x, y)}$$

$$d_x(x, y) = \frac{\partial (Y_n(x, y) \otimes G_1(x, y))}{\partial x}$$

-continued $$d_y(x, y) = \frac{\partial(Y_n(x, y) \otimes G_1(x, y))}{\partial y}$$

$$G_1(x, y) = \frac{1}{2\pi\sigma_1^2} \exp\left(-\frac{(x - (k_1 + 1))^2 + (y - (k_1 + 1))^2}{2\sigma_1^2}\right)$$

where, ε is in a range of $[10^{-14}, 10^{-10}]$ and the ε is $10^{-12}$ in the embodiment, $\otimes$ is a filtering operation, $G_1(x,y)$ is a 2D Gaussian kernel function, $k_1$ is a parameter on a window size of a filter, $k_1 \in [2,16]$ and the $k_1$ is 8 in the embodiment, and $\sigma_1$ is a standard deviation of the filter, $\sigma_1 \in (0,5]$ and the $\sigma_1$ is 2 in the embodiment.

(5) A final weight is determined

The final weight $W_n(x,y)$ is determined according to Eq. (5):

$$W_n(x, y) = \frac{g_n(x, y)}{\sum_{n=1}^{N} g_n(x, y) + \varepsilon} \quad (5)$$

$$g_n(x, y) = w_n(x, y) \otimes G_2(x, y)$$

$$G_2(x, y) = \frac{1}{2\pi\sigma_2^2} \exp\left(-\frac{(x - (k_2 + 1))^2 + (y - (k_2 + 1))^2}{2\sigma_2^2}\right)$$

$$w_n(x, y) = w_{1,n}(x, y) \times w_{2,n}(x, y) \times w_{3,n}(x, y)$$

where, $G_2(x,y)$ is a 2D Gaussian kernel function, $k_2$ is a parameter on a window size of a filter, $k_2 \in [2,20]$ and the $k_2$ is 10 in the embodiment, and $\sigma_2$ is a standard deviation of the filter, $\sigma_2 \in (0,10]$ and the $\sigma_2$ is 5 in the embodiment.

By determining the luminance distribution weight of the image, the exposure distribution weight of the image and the local gradient weight of the image, the embodiment combines the luminance distribution weight of the image, the exposure distribution weight of the image and the local gradient weight of the image to obtain the final weight. When the weight of the input image is determined, considerations are given to the feature distribution of the multi-exposure image. The weight function can adaptively compute the weight for each pixel in the images, and can obtain the weights of the images simply and quickly, to solve the technical problem that the existing MEF method does not consider the overall feature distribution of the multi-exposure image. The fused image has the advantages of high fusion quality, simple computation, abundant information and clear details, and so on.

(6) A fused image is determined

The input image and the weight are fused with an existing pyramid-based multi-resolution fusion method to determine the fused image. The pyramid-based multi-resolution fusion method has been disclosed on the following website:

https://github.com/tkd1088/multi-exposure-image-fusion/blob/master/code/functions/fusion_pyramid.m.

Figure 3:
FIG. 3 illustrates a fused image of Embodiment 1.

The MEF method based on a feature distribution weight of multi-exposure image is completed. The fused image is as shown in FIG. 3. It can be seen from FIG. 3 that the image processed with the method in the embodiment includes abundant information and clear details.

Embodiment 2

Taking four input images of the multi-exposure cave image as an example, the MEF method based on a feature distribution weight of a multi-exposure image in the embodiment includes the following steps:

(1) CST is performed on an image

The step is the same as that of Embodiment 1.

(2) A luminance distribution weight of the image is determined

The step is the same as that of Embodiment 1.

(3) An exposure distribution weight of the image is determined

The step is the same as that of Embodiment 1.

(4) A local gradient weight of the image is determined

The local gradient weight $w_{3,n}(x,y)$ of the image is determined according to Eq. (4):

$$w_{3,n}(x, y) = \frac{grad_n(x, y)}{\sum_{n=1}^{N} grad_n(x, y) + \varepsilon} \quad (11)$$

$$grad_n(x, y) = \sqrt{d_x^2(x, y) + d_y^2(x, y)}$$

$$d_x(x, y) = \frac{\partial(Y_n(x, y) \otimes G_1(x, y))}{\partial x}$$

$$d_y(x, y) = \frac{\partial(Y_n(x, y) \otimes G_1(x, y))}{\partial y}$$

$$G_1(x, y) = \frac{1}{2\pi\sigma_1^2} \exp\left(-\frac{(x - (k_1 + 1))^2 + (y - (k_1 + 1))^2}{2\sigma_1^2}\right)$$

where, ε is in a range of $[10^{-14}, 10^{-10}]$ and the ε is $10^{-14}$ in the embodiment, $\otimes$ is a filtering operation, $G_1(x,y)$ is a 2D Gaussian kernel function, $k_1$ is a parameter on a window size of a filter, $k_1 \in [2,16]$ and the $k_1$ is 2 in the embodiment, and $\sigma_1$ is a standard deviation of the filter, $\sigma_1 \in (0,5]$ and the $\sigma_1$ is 0.5 in the embodiment.

(5) A final weight is determined

The final weight $W_n(x,y)$ is determined according to Eq. (5):

$$W_n(x, y) = \frac{g_n(x, y)}{\sum_{n=1}^{N} g_n(x, y) + \varepsilon} \quad (12)$$

$$g_n(x, y) = w_n(x, y) \otimes G_2(x, y)$$

$$G_2(x, y) = \frac{1}{2\pi\sigma_2^2} \exp\left(-\frac{(x - (k_2 + 1))^2 + (y - (k_2 + 1))^2}{2\sigma_2^2}\right)$$

$$w_n(x, y) = w_{1,n}(x, y) \times w_{2,n}(x, y) \times w_{3,n}(x, y)$$

where, $G_2(x,y)$ is a 2D Gaussian kernel function, $k_2$ is a parameter on a window size of a filter, $k_2 \in [2,20]$ and the $k_2$ is 2 in the embodiment, and $\sigma^2$ is a standard deviation of the filter, $\sigma_2 \in (0,10]$ and the $\sigma_2$ is 0.5 in the embodiment.

Other steps are the same as those of Embodiment 1.

The MEF method based on a feature distribution weight of a multi-exposure image is completed.

Embodiment 3

Taking four input images of the multi-exposure cave image as an example, the MEF method based on a feature distribution weight of a multi-exposure image in the embodiment includes the following steps:

(1) CST is performed on an image

The step is the same as that of Embodiment 1.

(2) A luminance distribution weight of the image is determined

The step is the same as that of Embodiment 1.

(3) An exposure distribution weight of the image is determined

The step is the same as that of Embodiment 1.

(4) A local gradient weight of the image is determined

The local gradient weight $w_{3,n}(x,y)$ of the image is determined according to Eq. (4):

$$w_{3,n}(x,y) = \frac{grad_n(x,y)}{\sum_{n=1}^{N} grad_n(x,y) + \varepsilon} \quad (13)$$

$$grad_n(x,y) = \sqrt{d_x^2(x,y) + d_y^2(x,y)}$$

$$d_x(x,y) = \frac{\partial(Y_n(x,y) \otimes G_1(x,y))}{\partial x}$$

$$d_y(x,y) = \frac{\partial(Y_n(x,y) \otimes G_1(x,y))}{\partial y}$$

$$G_1(x,y) = \frac{1}{2\pi\sigma_1^2}\exp\left(-\frac{(x-(k_1+1))^2 + (y-(k_1+1))^2}{2\sigma_1^2}\right)$$

where, $\varepsilon$ is in a range of $[10^{-14}, 10^{-10}]$ and the $\varepsilon$ is $10^{-10}$ in the embodiment, $\otimes$ is a filtering operation, $G_1(x,y)$ is a 2D Gaussian kernel function, $k_1$ is a parameter on a window size of a filter, $k_1 \in [2,16]$ and the $k_1$ is 16 in the embodiment, and $\sigma_1$ is a standard deviation of the filter, $\sigma_1 \in (0,5]$ and the $\sigma_1$ is 5 in the embodiment.

(5) A final weight is determined

The final weight $W_n(x,y)$ is determined according to Eq. (5):

$$W_n(x,y) = \frac{g_n(x,y)}{\sum_{n=1}^{N} g_n(x,y) + \varepsilon} \quad (14)$$

$$g_n(x,y) = w_n(x,y) \otimes G_2(x,y)$$

$$G_2(x,y) = \frac{1}{2\pi\sigma_2^2}\exp\left(-\frac{(x-(k_2+1))^2 + (y-(k_2+1))^2}{2\sigma_2^2}\right)$$

$$w_n(x,y) = w_{1,n}(x,y) \times w_{2,n}(x,y) \times w_{3,n}(x,y)$$

where, $G_2(x,y)$ is a 2D Gaussian kernel function, $k_2$ is a parameter on a window size of a filter, $k_2 \in [2,20]$ and the $k_2$ is 20 in the embodiment, and $\sigma_2$ is a standard deviation of the filter, $\sigma_2 \in (0,10]$ and the $\sigma_2$ is 10 in the embodiment.

Other steps are the same as those of Embodiment 1.

The MEF method based on a feature distribution weight of a multi-exposure image is completed.

Taking four input images of the multi-exposure cave image as an example, comparative simulation experiments are conducted according to the MEF method based on a feature distribution weight of a multi-exposure image in Embodiment 1 (hereinafter referred to as the present disclosure), Exposure Fusion Method (hereinafter referred to as No. 1), Multi-exposure Image Fusion: A Patch-wise Approach (hereinafter referred to as No. 2), A Multi-Exposure Image Fusion Based on the Adaptive Weights Reflecting the Relative Pixel Intensity and Global Gradient (hereinafter referred to as No. 3), and Multi-exposure Image Fusion via a Pyramidal Integration of the Phase Congruency of Input Images with the Intensity-based Maps (hereinafter referred to as No. 4), to verify the effects of the present disclosure. The existing MEF-structural similarity index (MEF-SSIM), average information entropy and average color saturation are used for evaluations, in which the higher MEF-SSIM score is an indication of the better quality of the fused image, the higher average information entropy is an indication of the more abundant information in the image, and the higher average saturation is an indication of the brighter color of the image. The MEF-SSIM scores for the present disclosure, No. 1, No. 2, No. 3 and No. 4 are compared.

Experimental results are shown in Table 1.

TABLE 1

| MEF-SSIM scores of the present disclosure and other methods | | | | | |
|---|---|---|---|---|---|
| MEF | No. 1 | No. 2 | No. 3 | No. 4 | The present disclosure |
| MEF-SSIM score | 0.980 | 0.975 | 0.977 | 0.981 | 0.982 |

As can be seen from Table 1, comparing the present disclosure with No. 1, No. 2, No. 3 and No. 4 in terms of the MEF-SSIM score, the present disclosure has the highest MEF-SSIM score of 0.982, indicating that the present disclosure achieves the better quality of fused image than other methods.

The average information entropies for the present disclosure, No. 3 and No. 4 are compared, with the result shown in Table 2.

TABLE 2

| Average information entropies for the present disclosure and other methods | | | |
|---|---|---|---|
| MEF | No. 3 | No. 4 | The present disclosure |
| Average information entropy | 3.231 | 3.220 | 3.238 |

As can be seen from Table 2, comparing the present disclosure with No. 3 and No. 4 in terms of the average information entropy, the present disclosure has the largest average information entropy of 3.238, indicating that the present disclosure includes more abundant information in the fused image.

The average color saturations for the present disclosure, No. 3 and No. 4 are compared, with the result shown in Table 3.

TABLE 3

| Average color saturations for the present disclosure and other methods | | | |
|---|---|---|---|
| MEF | No. 3 | No. 4 | The present disclosure |
| Average color saturation | 0.280 | 0.289 | 0.290 |

As can be seen from Table 3, comparing the present disclosure with No. 3 and No. 4 in terms of the average color saturation, the present disclosure has the largest average color saturation of 0.290, indicating that the present disclosure achieves the fused image with the brighter color.

What is claimed is:

1. A multi-exposure image fusion (MEF) method based on a feature distribution weight of a multi-exposure image, comprising the following steps:

(1) performing color space transformation (CST) on an image transforming red, green, and blue (RGB) color components of an input multi-exposure image into a luminance component $Y_n(x,y)$, a blue chrominance component $Cb_n(x,y)$, and a red chrominance component $Cr_n(x,y)$:

$$Y_n(x,y)=0.257R_n(x,y)+0.564G_n(x,y)+0.098B_n(x,y)+16$$

$$Cb_n(x,y)=-0.148R_n(x,y)-0.291G_n(x,y)+0.439B_n(x,y)+128$$

$$Cr_n(x,y)=0.439R_n(x,y)-0.368G_n(x,y)-0.071B_n(x,y)+128 \quad (1)$$

wherein, $R_n(x,y)$ is a red component at a pixel (x,y) in an nth image, $G_n(x,y)$ is a green component at the pixel (x,y) in the nth image, $B_n(x,y)$ is a blue component at the pixel (x,y) in the nth image, n is a finite positive integer, $n\in[1,N]$, (x,y) is a position coordinate of the pixel, and N is a number of exposure images and is a finite positive integer;

(2) determining a luminance distribution weight of the image determining the luminance distribution weight $w_{1,n}(x,y)$ of the image according to eq. (2):

$$w_{1,n}(x,y) = \exp\left(-\frac{(Y_n(x,y)-(1-m_n))^2}{2S_n^2(x,y)}\right) \quad (2)$$

$$S_n(x,y) = \frac{Y_n(x,y)}{\sum_{n=1}^{N} Y_n(x,y)}$$

wherein, $m_n$ is a mean of the nth image;

(3) determining an exposure distribution weight of the image determining the exposure distribution weight $w_{2,n}(x,y)$ of the image according to eq. (3):

$$w_{2,n}(x,y) = 1 - D_n(x,y) \quad (3)$$

$$D_n(x,y) = |Y_n(x,y) - m(x,y)|$$

$$m(x,y) = \frac{1}{N}\sum_{n=1}^{N} Y_n(x,y)$$

(4) determining a local gradient weight of the image determining the local gradient weight $w_{3,n}(x,y)$ of the image according to eq. (4):

$$w_{3,n}(x,y) = \frac{grad_n(x,y)}{\sum_{n=1}^{N} grad_n(x,y) + \varepsilon} \quad (4)$$

$$grad_n(x,y) = \sqrt{d_x^2(x,y) + d_y^2(x,y)}$$

$$d_x(x,y) = \frac{\partial(Y_n(x,y) \otimes G_1(x,y))}{\partial x}$$

$$d_y(x,y) = \frac{\partial(Y_n(x,y) \otimes G_1(x,y))}{\partial y}$$

$$G_1(x,y) = \frac{1}{2\pi\sigma_1^2}\exp\left(-\frac{(x-(k_1+1))^2 + (y-(k_1+1))^2}{2\sigma_1^2}\right)$$

wherein, $\varepsilon$ is in a range of $[10^{-14}, 10^{-10}]$, $\otimes$ is a filtering operation, $G_1(x,y)$ is a two-dimensional (2D) Gaussian kernel function, $k_1$ is a parameter on a window size of a filter, $k_1 \in [2,16]$, and $\sigma_1$ is a standard deviation of the filter, $\sigma_1 \in (0,5]$;

(5) determining a final weight determining the final weight $W_n(x,y)$ according to eq. (5):

$$W_n(x,y) = \frac{g_n(x,y)}{\sum_{n=1}^{N} g_n(x,y) + \varepsilon} \quad (5)$$

$$g_n(x,y) = w_n(x,y) \otimes G_2(x,y)$$

$$G_2(x,y) = \frac{1}{2\pi\sigma_2^2}\exp\left(-\frac{(x-(k_2+1))^2 + (y-(k_2+1))^2}{2\sigma_2^2}\right)$$

$$w_n(x,y) = w_{1,n}(x,y) \times w_{2,n}(x,y) \times w_{3,n}(x,y)$$

wherein, $G_2(x,y)$ is a 2D Gaussian kernel function, $k_2$ is a parameter on a window size of a filter, $k_2 \in [2,20]$, and $\sigma_2$ is a standard deviation of the filter, $\sigma_2 \in (0,10]$; and (6) determining a fused image fusing the input image and the weight with an existing pyramid-based multi-resolution fusion method to determine the fused image; and completing the MEF method based on a feature distribution weight of a multi-exposure image.

2. The MEF method based on a feature distribution weight of a multi-exposure image according to claim 1, wherein in step (4), the $k_1$ is 8, and the $\sigma_1$ is 2.

3. The MEF method based on a feature distribution weight of a multi-exposure image according to claim 1, wherein in step (5), the $k_2$ is 10, and the $\sigma_2$ is 5.

* * * * *